United States Patent
Takeda et al.

(10) Patent No.: US 7,111,818 B2
(45) Date of Patent: Sep. 26, 2006

(54) SAFETY VALVE

(75) Inventors: Masaru Takeda, Amagasaki (JP);
Akira Oi, Amagasaki (JP); Mitsumasa Kagomoto, Amagasaki (JP); Shinji Maekawa, Amagasaki (JP); Kazuyuki Miyata, Amagasaki (JP); Mari Shiotsuki, Amagasaki (JP)

(73) Assignee: Neriki Valve Co., Ltd., Hyogo (JP)

( * ) Notice: Subject to any disclaimer, the term of this patent is extended or adjusted under 35 U.S.C. 154(b) by 22 days.

(21) Appl. No.: 11/085,467

(22) Filed: Mar. 21, 2005

(65) Prior Publication Data

US 2005/0211940 A1    Sep. 29, 2005

(30) Foreign Application Priority Data

Mar. 29, 2004  (JP) .................. P 2004-094249

(51) Int. Cl.
*F16K 51/00* (2006.01)
(52) U.S. Cl. .................. 251/144; 137/75; 137/79
(58) Field of Classification Search ........... 251/144; 137/72, 74, 75, 79, 80, 613
See application file for complete search history.

(56) References Cited

U.S. PATENT DOCUMENTS

| | | | |
|---|---|---|---|
| 4,744,383 A * | 5/1988 | Visnic et al. ................. 137/72 |
| 5,048,565 A * | 9/1991 | Oi ............................. 251/149.6 |
| 5,063,976 A * | 11/1991 | Oi et al. ...................... 251/151 |
| 5,144,973 A * | 9/1992 | Green et al. ................. 137/71 |
| 5,309,945 A | 5/1994 | Sakai et al. |
| 5,511,576 A | 4/1996 | Borland |
| 5,738,145 A * | 4/1998 | Daicho et al. .............. 137/878 |
| 5,743,285 A | 4/1998 | Shalkevich |
| 6,293,307 B1 * | 9/2001 | Oi et al. .................. 137/614.2 |
| 6,367,499 B1 * | 4/2002 | Taku ........................... 137/72 |
| 6,626,204 B1 * | 9/2003 | Oi et al. ....................... 251/89 |
| 6,691,729 B1 * | 2/2004 | Takeda et al. ................ 137/74 |

FOREIGN PATENT DOCUMENTS

| | | |
|---|---|---|
| JP | 25-7390 | 4/1927 |
| JP | 7-225000 A | 8/1995 |
| JP | 10-281398 A | 10/1998 |
| JP | 11-94197 A | 4/1999 |
| JP | 2000-310397 A | 11/2000 |
| JP | 2002-168399 A | 6/2002 |
| JP | 2002-181298 A | 6/2002 |
| JP | 2003-247652 A | 9/2003 |
| JP | 2003-247700 A | 9/2003 |
| JP | 2003-322267 A | 11/2003 |
| JP | 2003-329200 A | 11/2003 |

* cited by examiner

*Primary Examiner*—John Bastianelli
(74) *Attorney, Agent, or Firm*—Akin Gump Strauss Hauer & Feld, LLP

(57) ABSTRACT

A safety valve comprises a pressure receiving hole (20), an actuation chamber (21), a discharging hole (22) and an alloy accommodating chamber (25). An alloy (27) of a low-temperature melting point is accommodated within the alloy accommodating chamber (25). A sealing plate (33) seals the pressure receiving hole (20). This sealing plate (33) has a portion, which faces the pressure receiving hole (20), provided with a breakable sealing portion (35) that breaks up with a predetermined pressure. An actuator (28) is arranged within the actuation chamber (21). The actuator (28) has one end formed with a first back-up portion (30) which supports the breakable sealing portion (35) and has the other end formed with a second back-up portion (31) which is supported by the alloy (27).

5 Claims, 3 Drawing Sheets

SAFETY VALVE

BACKGROUND OF THE INVENTION

Field of the Invention

The present invention relates to a safety valve which is attached to a fuel gas cylinder for automobiles or the like and employs an alloy of a low-temperature melting point. More particularly, it concerns a safety valve capable of sufficiently reducing the amount of a gas leaked out of a hole for discharging the gas in a normal state but able to promptly operate for safely discharging the gas from the gas discharging hole when the atmosphere has its temperature raised above a predetermined temperature.

An automobile which utilizes natural gas or the like gaseous fuel is loaded with a gas cylinder filled with a fuel gas compressed under a high pressure. Although this gas cylinder has an ability of a predetermined pressure-resistance, it is provided with a safety valve so that it does not break up when the atmosphere has its temperature abnormally raised due to a fire or the like occurred at the time of an accident. This safety valve operates so as to release the gas within the pressure cylinder outwards when the atmosphere has its temperature raised above a predetermined temperature.

One of the above-mentioned safety valves has a gas escape passage sealed openably, an alloy of a low-temperature melting point which seals the gas escape passage in solid state but opens it upon melting, and a chamber for accommodating the alloy, and a passage for discharging the melting alloy out of the chamber for accommodating the alloy. As for this safety valve utilizing the alloy of a low-temperature melting point, when the atmosphere has its temperature raised above the set operating temperature, the alloy melts and is discharged out of the alloy discharging hole so as to open the gas escape passage, thereby discharging the high-pressure gas within the gas cylinder outwards and preventing the gas cylinder from breaking up.

Generally, the alloy of the low-temperature melting point easily causes a flow deformation (so-called creep) under a high pressure even if it is in solid state at a temperature lower than the set operating temperature. Therefore, conventionally, there is a safety valve which is provided with a piston-like actuator having a larger-diameter portion and a smaller-diameter portion (for example, see Patent Public Disclosure No. 2003-247652) in order to inhibit the amount of the alloy, which is flowed out of the chamber for accommodating the alloy of a low-temperature melting point, by this creep.

More specifically, this conventional technique is provided with a pressure receiving hole, an actuation chamber and a discharging hole, and a chamber for accommodating an alloy. The actuation chamber accommodates a piston-like actuator. This actuator is formed with a larger-diameter portion and a smaller-diameter portion. This larger-diameter portion is supported by the alloy of the low-temperature melting point accommodated within the chamber for accommodating the alloy. And an O-ring is externally fitted onto the smaller-diameter portion to form a sealing portion, which is airtightly and slidably inserted into the pressure receiving hole.

In a normal sate, the actuator is supported by the alloy of the low-temperature melting point and the sealing portion surely seals the pressure receiving hole. At this time, although a supporting pressure is applied onto the alloy of the low-temperature melting point, it is made lower than a gas pressure applied to the pressure receiving hole in correspondence with a ratio of the larger-diameter portion to the smaller-diameter portion in area. As a result, this alloy of the low-temperature melting point is prevented from flowing out of the alloy accommodating chamber by the creep.

On the other hand, when the atmosphere of the safety valve is raised above the set temperature, the alloy of the low-temperature melting point melts, so that the actuator loses its support and moves toward the alloy accommodating chamber. Simultaneously, the sealing portion slidably moves to escape from the pressure receiving hole, thereby canceling the sealing of the pressure receiving hole and allowing the gas within the gas cylinder to be safely discharged from the pressure receiving hole to the exterior area through the discharging hole safely.

Recently, it is promoted to employ in an automobile, a fuel cell which uses hydrogen gas. However, it is desired to highly pressurize this hydrogen gas cylinder so as to let it have a large volume of, for example, 35 to 70 MPa. Besides, since the hydrogen gas has a small molecular weight, it is readily permeable through a rubber sealing member.

For these reasons, with the safety valve of the conventional technique, there is a likelihood that the hydrogen gas readily permeates through the O-ring at the sealing portion. Therefore, there has been a problem that in a normal state, it is not easy to sufficiently reduce the amount of the gas leaked through the discharging hole.

Further, along with the highly pressurizing of the gas cylinder, as a higher gas pressure is applied to the pressure receiving hole, the O-ring tends to readily protrude from a retaining groove formed at the smaller-diameter portion. In order to prevent this protrusion, the O-ring must have its section formed into a particular shape. This results in enlarging a sliding resistance of the sealing portion to an inner surface of the pressure receiving hole to delay the movement of the actuator when the temperature abnormally rises. It causes a problem that the safety valve can hardly operate promptly and safely.

SUMMARY OF THE INVENTION

The present invention has a technical object to solve the above-mentioned problems and to provide a safety valve which can sufficiently reduce the amount of a gas leaked out of a gas discharging hole in a normal state and promptly operate to safely discharge the gas through the gas discharging hole when the atmosphere has its temperature raised above a predetermined temperature.

In order to accomplish the above-mentioned object, the present invention has constructed a safety valve as follows, for example, when an embodiment of the present invention is explained based on FIGS. 1 to 4.

More specifically, the present invention concerns a safety valve. The safety valve has a pressure receiving hole (20), an actuation chamber (21), a discharging hole (22) and a chamber (25) for accommodating an alloy. A sealing member (34) seals the pressure receiving hole (20) so as to be able to cancel the sealing. The sealing member (34) is supported by an alloy (27) of a low-temperature melting point that is accommodated within the alloy accommodating chamber (21). The sealing member (34) is composed of a sealing plate (33). This sealing plate (33) has at least a portion, which faces the pressure receiving hole (20), provided with a breakable sealing portion (35) which breaks with a predetermined pressure. An actuator (28) is arranged within the actuation chamber (21). This actuator (28) has one end formed with a first back-up portion (30) which supports the breakable sealing portion (35) and has the other end formed with a second back-up portion (31) supported by the alloy (27).

At a normal time, the breakable sealing portion which faces the pressure receiving hole of the sealing plate is supported by the first back-up portion and the second back-up portion of the actuator is supported by the alloy of the low-temperature melting point. As a result, if the alloy of the low-temperature melting point is in solid state at a temperature below a set temperature, the breakable sealing portion is assuredly supported by the alloy through the actuator and therefore does not break up. Additionally, the sealing member being composed of the sealing plate, this sealing plate sufficiently shuts off even the gas of small molecular weight like hydrogen gas. Therefore, the pressure receiving hole is surely sealed by the breakable sealing portion of the sealing plate.

On the other hand, when the atmosphere has its temperature abnormally raised above the set temperature, the alloy of the low-temperature melting point melts and is fluidized. This inhibits the second back-up portion from being supported by the alloy of the low-temperature melting point, so that the actuator moves toward the alloy accommodating chamber and the first back-up portion is going to separate from the breakable sealing portion. As a result, the breakable sealing portion loses the support by the first back-up portion to result in largely deforming upon receipt of a gas pressure applied to the pressure receiving hole and breaking up. This cancels the sealing of the pressure receiving hole and therefore the gas within a gas cylinder or the like which communicates with the pressure receiving hole is safely discharged from the pressure receiving hole to the exterior area through the discharging hole.

In the case where the second back-up portion has a surface, which is supported by the alloy of the low-temperature melting point, formed larger in area than the breakable sealing portion which faces the pressure receiving hole, the support pressure applied to the alloy of the low-temperature melting point is made lower than the gas pressure applied to this breakable sealing portion in correspondence with a ratio of area, thereby preventing the creep which occurs in the alloy of the low-temperature melting point. Therefore, this case is preferable.

The sealing plate may be directly sandwiched, for example, between a sleeve and a housing of a cylinder valve or the like. However, if the sealing plate has a peripheral edge portion where a gasket is airtightly arranged and then is sandwiched between the sleeve and the housing of the cylinder valve or the like, it is possible to fully ensure the airtightness around the sealing plate. So this is preferable.

Although the sealing plate is formed from a material of a low gas permeability, generally metal materials are employed. Among them, it is preferable to use a material having a high corrosion resistance and a good ability of spreading such as copper.

It suffices if the sealing plate can seal the pressure receiving hole. Since the breakable sealing portion which faces the pressure receiving hole is supported by the alloy of the low-temperature melting point through the actuator, it does not have to withstand a high pressure. Then in the event that the sealing plate has a surface opposite to the actuation chamber, communicated with an interior space of the gas cylinder and the breakable sealing portion is constituted so as to be able to break with a gas pressure lower than a pressure normally used within the gas cylinder, when the alloy of the low-temperature melting point melts by an abnormal temperature rise to let the breakable sealing portion lose the support, even if the gas pressure within the gas cylinder does not exceed over the normally used pressure, the breakable sealing portion easily breaks to cancel the sealing of the pressure receiving hole, thereby enabling the safety valve to promptly and safely operate. Therefore, this case is preferable.

Provided that the actuator is urged toward the alloy accommodating chamber by a biasing spring, it can immediately move toward the alloy accommodating chamber by a resilient force exerted by the biasing spring when the alloy melts. Therefore, the breakable sealing portion quickly loses its support and breaks up, thereby enabling the safety valve to operate promptly and safely.

In the case where the first back-up portion is inserted into the pressure receiving hole arranged downstream of the breakable sealing portion and has a periphery to which an annular second sealing member able to airtightly slide on an inner surface of the pressure receiving hole is attached, when the breakable sealing portion breaks and the gas is flowed into the pressure receiving hole arranged downstream, the pressure of this gas pushes the actuator to move it promptly toward the alloy accommodating chamber. As a result, the sealing of the pressure receiving hole is immediately cancelled, thereby allowing the safety valve to operate safely. Therefore, this is preferable.

Effect of the Invention

Since the present invention is constituted and operated as above, it offers the following advantages.
(1) The sealing member which seals the pressure receiving hole is composed of a sealing plate. Therefore, even if the gas which tries to permeate through the pressure receiving hole has so small a molecular weight as hydrogen gas, it is surely shut off by this sealing plate. As a result, in a normal state, it is possible to sufficiently reduce the amount of the gas leaked out of the gas discharging hole.
(2) When the atmosphere has its temperature raised above the predetermined temperature, the breakable sealing portion supported through the actuator by the alloy of the low-temperature melting point loses its support and breaks to cancel the sealing of the pressure receiving hole. As a result, the safety valve promptly operates and can discharge the gas through the gas discharging hole safely.

BRIEF DESCRIPTION OF THE DRAWINGS

FIG. 2(a) is a sectional view of the safety valve and FIG. 2(b) is an enlarged sectional view of a portion (B) in FIG. 2(a);

DETAILED DESCRIPTION OF THE PREFERRED EMBODIMENTS

Hereafter, an explanation is given for an embodiment of the present invention based on the attached drawings.

Figure 1:
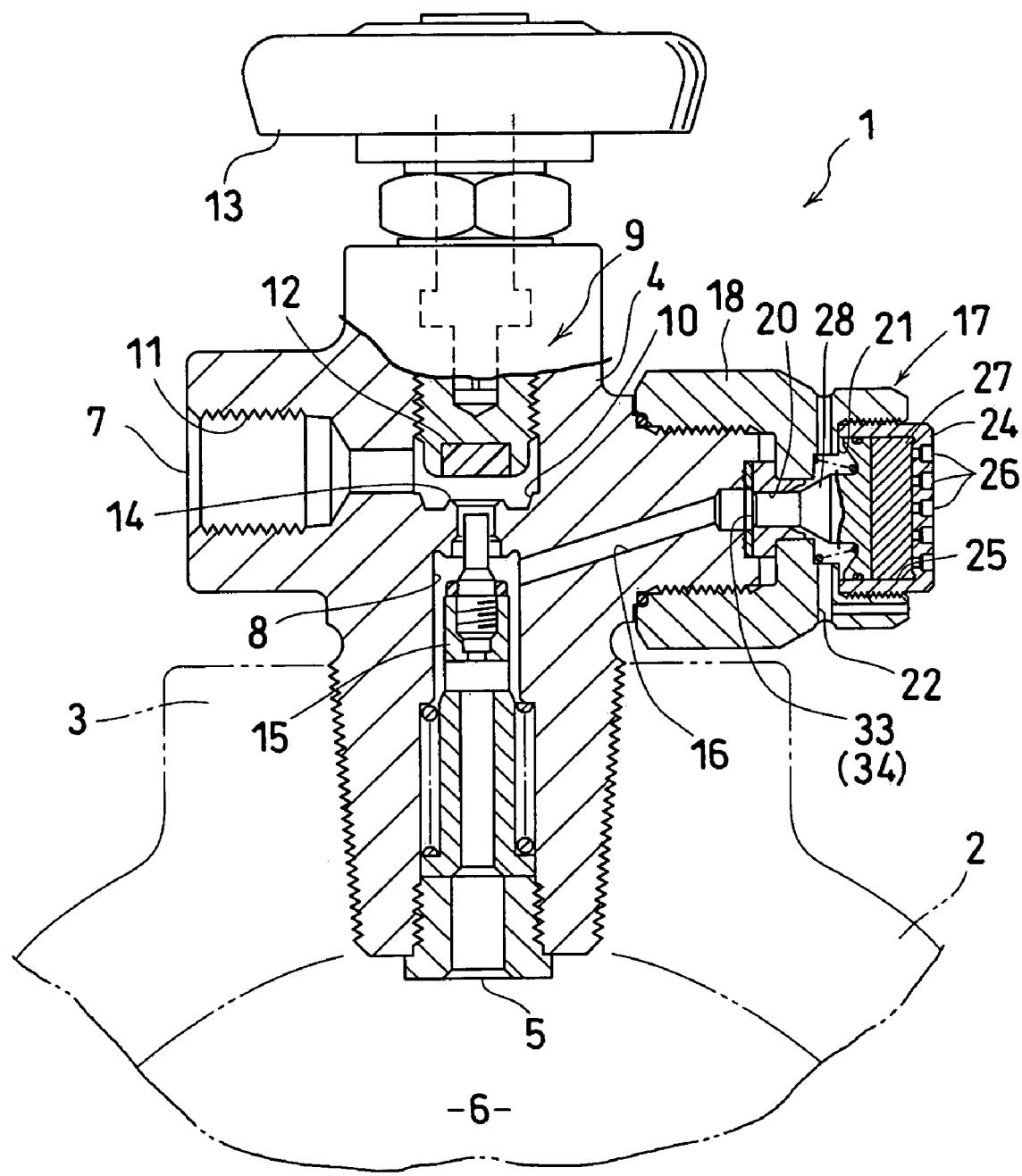
FIG. 1 is a sectional view of a cylinder valve provided with a safety valve of an embodiment according to the present invention.
Figure 2A:
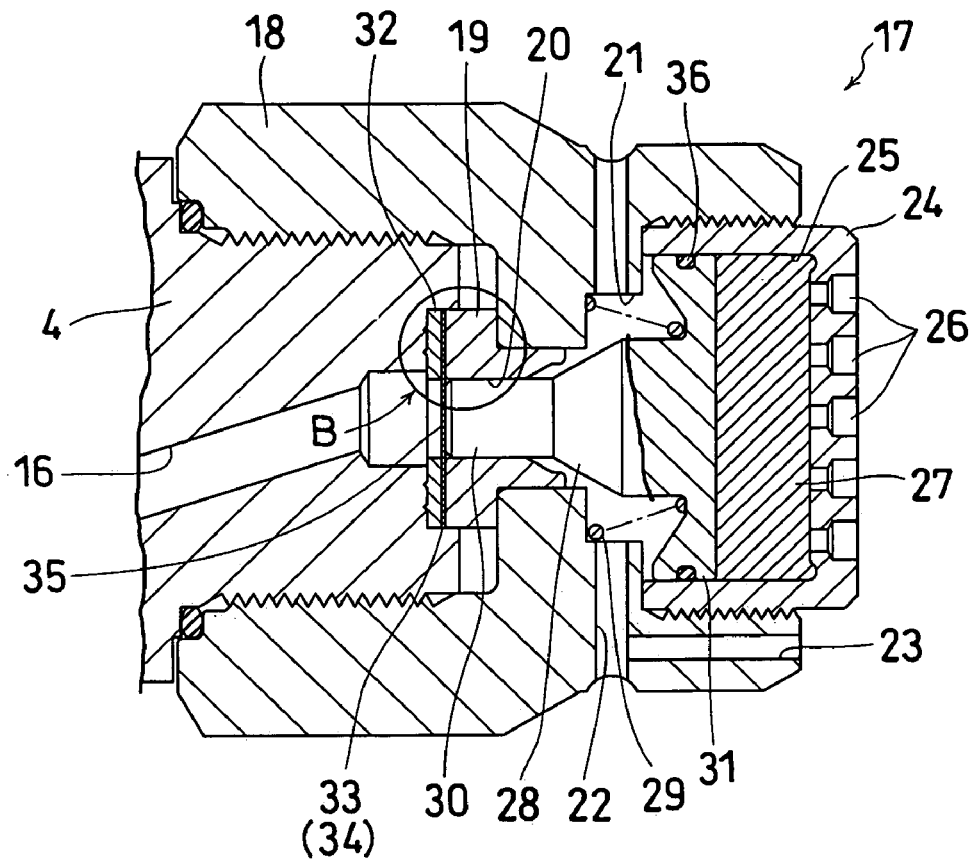
FIGS. 2(a) and 2(b) show the safety valve of the embodiment according to the present invention, in a normal state.
Figure 2B:
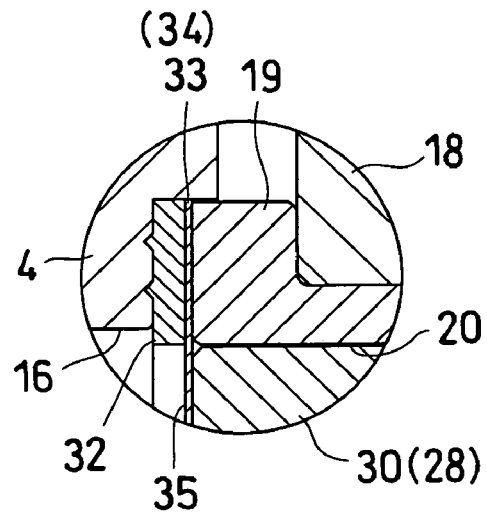
Figure 3:
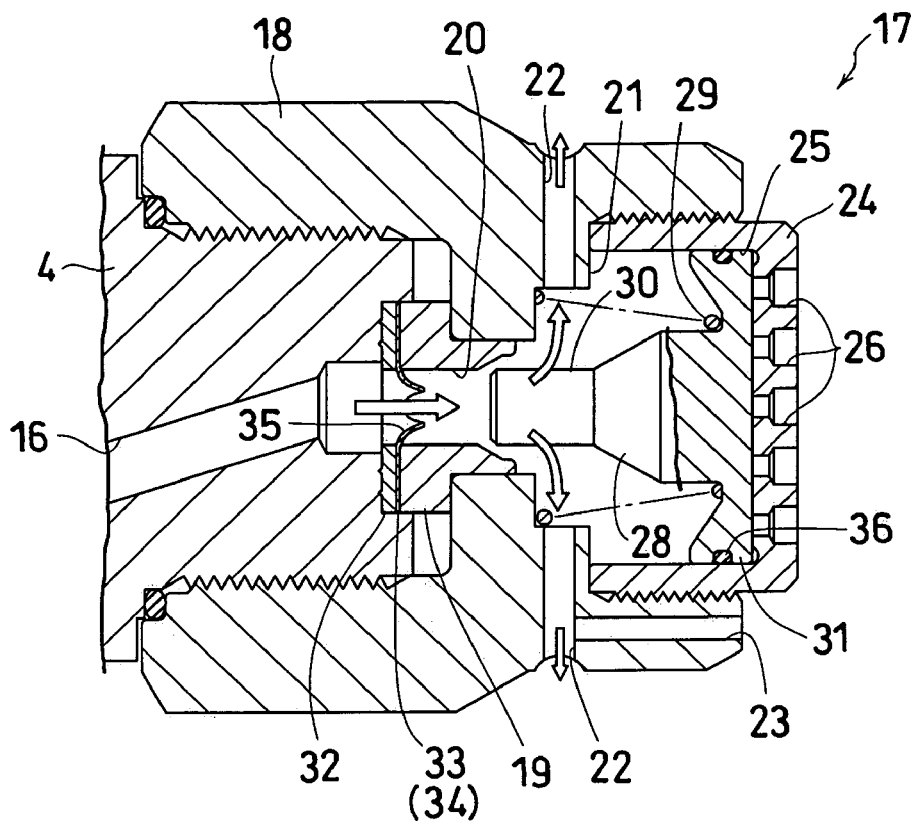
FIG. 3 is a sectional view of the safety valve of the embodiment according to the present invention when it effects a safety operation.

FIGS. 1 to 3 show an embodiment of a safety valve according to the present invention. FIG. 1 is a sectional view of a cylinder valve provided with the safety valve. FIGS. 2(a) and 2(b) show the safety valve in a normal state. FIG. 2(a) is a sectional view of the safety valve. FIG. 2(b) is an enlarged sectional view of a portion (B) in FIG. 2(a). FIG. 3 is a sectional view of the safety valve in a safety operation.

As shown in FIG. 1, the cylinder valve (1) is fixed to a neck portion (3) of a gas cylinder (2) such as a hydrogen gas cylinder in screw-thread engagement. Needless to say, the cylinder valve (1) is positioned in a non-limitative direction. However, in this embodiment, for convenience, an explanation is given for the cylinder valve positioned vertically as shown in FIG. 1.

The cylinder valve (1) has a housing (4) formed at its bottom surface with a gas inlet (5), which opposes to an interior space (6) of the gas cylinder (2). This housing (4) has a side surface opened to provide a gas outlet (7), which is connected to a take-out piping or the like not shown.

The housing (4) has an interior area provided with an inlet passage (8), a shut-off valve chamber (10) of a shut-off valve (9) and an outlet passage (11) in the mentioned order, between the gas inlet (5) and the gas outlet (7). A shut-off member (12) is inserted into the shut-off valve chamber (10). An operation handle (13) is interlockingly connected to the shut-off member (12) The shut-off valve chamber (10) is provided with a valve seat (14). When the operation handle (13) is operated to separate the shut-off member (12) from this valve seat (14) or bring it into contact therewith, the shut-off valve (9) is opened or closed. Further, an excessive-flow preventing valve (15) is arranged at the inlet passage (8). However, this valve (15) may be omitted, for example, in the case where an excessive-flow preventing device is arranged at the gas take-out piping.

The inlet passage (8) has a mid portion from which a gas escape passage (16) is branched. A safety valve (17) is attached to the gas escape passage (16) so as to seal the gas escape passage (16). If the atmosphere has its temperature raised above a predetermined temperature, this safety valve (17) effects a safety operation so as to cancel the sealing of the gas escape passage (16), thereby the gas stored within the gas cylinder to be discharged from the safety valve (17) to an exterior area through the inlet passage (8) and the gas escape passage (16) in the mentioned order.

Next, an explanation is given for a structure of the safety valve.

As shown in FIG. 2(a), the safety valve (17) is provided with a cylindrical valve case (18) to be fixed to the housing (4) in screw-thread engagement. A cylindrical sleeve (19) is supported within the valve case (18). A pressure receiving hole (20) is formed within the sleeve (19).

Formed within the valve case (18) is an actuation chamber (21) which communicates with the pressure receiving hole (20). This valve case (18) has a peripheral wall provided with a plurality of discharging holes (22), through which the actuation chamber (21) communicates with the exterior area. Numeral 23 indicates a gas-leakage detecting hole. For instance, all the discharging holes 22 are closed by externally fitting an annular closure member or the like onto the valve case (18). In this state, it is checked whether or not the gas is flowed out of the gas-leakage detecting hole (23).

The valve case (18) has an outer end portion to which a cylindrical bottomed cap (24) is fixed in screw-thread engagement. An alloy accommodating chamber (25) is formed inside this cap (24). The cap (24) has a bottom wall provided with holes (26) for discharging an alloy, which holes communicate with the exterior area. And the alloy accommodating chamber (25) accommodates an alloy (27) of a low-temperature melting point which crystallizes at a temperature within a range of about 100 to 110 degrees C.

The actuation chamber (21) accommodates a piston-like actuator (28), which is biased toward the alloy accommodating chamber (25) by a resilient force of a biasing spring (29) arranged within the actuation chamber (21). This actuator (28) is provided with a first back-up portion (30) of a smaller diameter and with a second back-up portion (31) of a larger diameter. The first back-up portion (30) is inserted into the pressure receiving hole (20) and the second back-up portion (31) is supported by the alloy (27).

As shown in FIG. 2(b), a sealing plate (33) is sandwiched and fixed through a gasket (32) made of a metal or a synthetic resin between the sleeve (19) and the housing (4). This sealing plate (33) constitutes a sealing member (34) which seals the pressure receiving hole (20). This sealing plate (33) has a portion opposite to the pressure receiving portion (20), formed with a breakable sealing portion (35). This breakable portion (35) is set to have such a thickness that it readily deforms and breaks with a predetermined pressure, for example, a pressure lower than a pressure normally used within the gas cylinder (2). The first back-up portion (30) has a leading end brought into contact with the breakable sealing portion (35) from a side opposite to the escape passage (16). Thus the breakable sealing portion (35) is supported by the first back-up portion (30) so that it does not largely deform nor break up even if it receives a gas pressure from the gas escape passage (16). The second back-up portion (31) has a surface supported by the alloy (27), which opposes to the pressure receiving hole (20) and is formed larger in area than the breakable sealing portion (35) supported by the first back-up portion (30).

Next, an explanation is given for the operation of the safety valve.

The actuator (28) is biased toward the alloy accommodating chamber (25) upon receipt of a gas pressure through the breakable sealing portion (35) of the sealing plate (33) as well as a resilient force of the biasing spring (29). The alloy (27) receives a pushing force exerted by the second back-up portion (31) of the actuator (28). However, in the normal state where the atmosphere has a temperature lower than the set temperature, this alloy (27) is in solid state and supports the actuator (28) against the pushing force so that the actuator (28) does not move. Owing to this arrangement, the breakable sealing portion (35) is surely supported by the first back-up portion (30) of this actuator (28), so that the breakable sealing portion (35) does not break. This results in retaining the sealing of the pressure receiving hole (20).

At this time, since the sealing plate (33) has the peripheral edge portion assuredly sandwiched through the gasket (32) between the sleeve (19) and the housing (4), even if the gas stored within the gas cylinder (2) has a small molecular weight such as hydrogen gas, the amount of the gas leaked out of the safety valve (17) is sufficiently reduced.

Meanwhile, the supported surface of the second back-up portion (31) is larger in area than the breakable sealing portion (35) which faces the pressure receiving hole (20). The pushing force applied to the alloy (27) through the breakable sealing portion (35) by the gas pressure is weakened in correspondence with the ratio of area. This suppresses the occurrence of the creep phenomenon that the alloy of the low-temperature melting point is gradually pushed out through the alloy discharging holes (26) upon receipt of a high stress.

When the atmosphere of the safety valve (17) has its temperature raised to a predetermined temperature, for example not less than 105 degrees C. due to the fire or the like accidents, the alloy (27) melts to be formed into a liquid state and is pushed out of the alloy discharging holes (26) by the pushing force of the actuator (28). The second back-up portion (31) has a peripheral surface to which an O-ring or the like packing (36) is attached in order that the melted alloy (27) cannot readily flow into the actuation chamber (21). However, should this alloy (37) be flowed into the actuation chamber (21), so far as there is no fear that the pressure receiving hole (20) and the discharging holes (22) are clogged, this packing (36) may be omitted.

If the alloy (27) of the low-temperature melting point is pushed out of the alloy discharging holes (26), the second back-up portion (31) is no longer supported by the alloy (27) and therefore the actuator (28) moves toward the alloy accommodating chamber (25). Along with the movement of this actuator (28), the first back-up portion (30) gets out and away from the pressure receiving hole (20) toward the actuation chamber (21) and has its leading end separated and spaced from the breakable sealing portion (35). Thus this breakable sealing portion (35) loses the support by the first back-up portion (30) and largely deforms and breaks upon receipt of the gas pressure from the gas escape passage (16) to come into a state shown in FIG. 3. This cancels the sealing of the pressure receiving hole (20), thereby allowing the gas stored within the gas cylinder to be safely discharged to the exterior area through the inlet passage (8), the gas escape passage (16), the pressure receiving hole (20), the actuation chamber (21) and the discharging holes (22) in the mentioned order.

The safety valve explained in the above embodiment is exemplified only so as to embody the technical idea of the present invention. Therefore, the material, shape, quantity and structure or the like of each part are not limitative to the embodiment but they are changeable in various ways within the scope of claims of the present invention.

Figure 4:
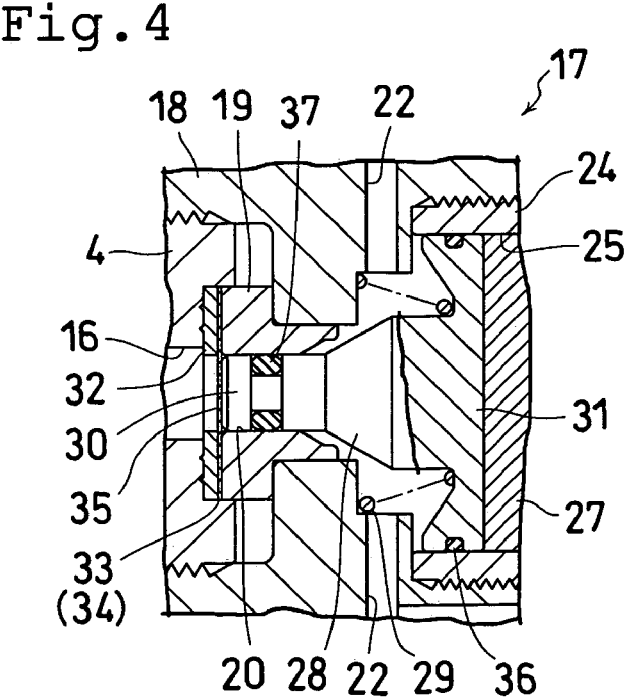
FIG. 4 shows a modification of the embodiment according to the present invention and is a sectional view in the vicinity of an actuator.

For example, a modification shown in FIG. 4 attaches to a periphery of the first back-up portion (30), a second annular sealing member (37) able to airtightly slide on the inner surface of the pressure receiving hole (20). Thus when the breakable sealing portion (35) breaks to let the gas flow into the pressure receiving hole (20), this gas pressure pushes the actuator (28), which can immediately move toward the alloy accommodating chamber (25).

Further, in the above embodiment, the sealing plate (33) is arranged upstream of the pressure receiving hole (20). However, according to this invention, this sealing plate (33) may be disposed at a mid portion or a downstream end of the pressure receiving hole (20).

Besides, the pressure receiving hole (20) may be connected directly to the discharging hole (22) without the actuation chamber (21).

In the above embodiment, the breakable sealing portion (35) of the sealing plate (33) is set so that it breaks with a gas pressure lower than the pressure normally used within the gas cylinder. In consequence, when the alloy of the low-temperature melting point melts due to the abnormally raised temperature and as a result the breakable sealing portion loses its support, the safety valve can promptly effect the safety operation. However, this breakable sealing portion may be constituted so that it breaks at a set pressure higher than the pressure normally used within the gas cylinder. In this case, if the atmosphere has its temperature abnormally raised and the pressure within the gas cylinder has its pressure abnormally increased, the safety valve can effect the safety operation.

In the above embodiment, the gas has been directly discharged to the air through the discharging holes (22) at the time of the safety operation. However, according to the present invention, a gas discharging passage (not shown) may be connected to the discharging holes (22) so as to guide the gas to an optional position and discharge it.

The respective shapes and structures of the cylinder valve and the gas cylinder are not limited to those of the embodiment. Needless to say, the gas to be stored within the gas cylinder is not limited to that of a specific kind.

The safety valve of the present invention can sufficiently reduce the amount of the gas leaked out of the gas discharging holes on the normal state and promptly operates to safely discharge the gas through the gas discharging hole when the atmosphere has its temperature raised above the predetermined temperature. Accordingly, it is preferable as a safety valve which is attached to a gas cylinder or a cylinder valve. It is especially preferable as a safety valve which is attached to a gas cylinder or the like storing gas of a small molecular weight at a high pressure such as a hydrogen gas cylinder for a fuel cell.

What is claimed is:

1. A safety valve comprising a pressure receiving hole (20), an actuation chamber (21), a discharging hole (22) and an alloy accommodating chamber (25), a sealing member (34) sealing the pressure receiving hole (20) so as to be able to cancel the sealing, the sealing member (34) being supported by an alloy (27) of a low-temperature melting point accommodated within the alloy accommodating chamber (25), the sealing member (34) being composed of a sealing plate (33), this sealing plate (33) having at least a portion, which faces the pressure receiving hole (20), provided with a breakable sealing portion (35) that breaks up with a predetermined pressure, an actuator (28) being arranged in the actuation chamber (21), the actuator (28) having one end formed with a first back-up portion (30) which supports the breakable sealing portion (35) and having the other end formed with a second back-up portion (31) which is supported by the alloy (27) of the low-temperature melting point.

2. The safety valve as set forth in claim 1, wherein the second back-up portion (31) has a surface supported by the alloy (27), which is formed larger in area than the breakable sealing portion (35) opposed to the pressure receiving hole (20).

3. The safety valve as set forth in claim 1, wherein the sealing plate (33) has a peripheral edge portion at which a gasket (32) is airtightly arranged.

4. The safety valve as set forth in claim 1, wherein the sealing plate (33) has a side opposite to the actuation chamber (21), which side is communicated with an interior space (6) of a gas cylinder (2) and the breakable portion (35) is adapted to break up with a gas pressure lower than a pressure normally used within this gas cylinder (2).

5. The safety valve as set forth in claim 1, wherein the first back-up portion (30) is inserted into the pressure receiving hole (20) positioned downstream of the breakable portion (35) and has a periphery to which an annular second sealing member (37) able to airtightly slide on an inner surface of the pressure receiving hole (20) is attached.

\* \* \* \* \*